United States Patent [19]
Hall et al.

[11] 3,861,145
[45] Jan. 21, 1975

[54] MULTIPLE HYDRAULIC CONTROL CIRCUITS WITH PRESSURE COMPENSATED FLOW CONTROL AND A SINGLE VARIABLE DELIVERY PUMP

[75] Inventors: Gerald D. Hall; Allyn J. Hein; Howard L. Johnson; John A. Junck, all of Joliet, Ill.

[73] Assignee: Caterpillar Tractor Co., Peoria, Ill.

[22] Filed: Oct. 1, 1973

[21] Appl. No.: 402,367

[52] U.S. Cl......................... 60/427, 60/445, 60/484
[51] Int. Cl............................................. F16h 39/46
[58] Field of Search ............. 60/443, 445, 452, 464, 60/427

[56] References Cited
UNITED STATES PATENTS

| | | | |
|---|---|---|---|
| 2,892,312 | 6/1959 | Allen et al. | 60/427 |
| 3,444,689 | 5/1969 | Budzich | 60/427 |
| 3,470,694 | 10/1969 | Budzich | 60/427 |
| 3,744,517 | 7/1973 | Budzich | 137/596.2 |

*Primary Examiner*—Edgar W. Geoghegan
*Attorney, Agent, or Firm*—Phillips, Moore, Weissenberger, Lempio & Strabala

[57] ABSTRACT

A fluid delivery system is provided having multiple hydraulic control circuits and a variable displacement pump controlled by a pressure compensated servo control which is responsive to circuit pressure for regulating pump displacement and thus provide pump output commensurate with demand from the load circuits. A control mechanism including a control valve has a pair of variable orifices in series which are created by the main control valve spool and a pressure compensated flow control spool in serial arrangement therewith precisely controls the fluid volume flow to a load system in proportion to the opening of the variable orifices. A pressure compensated servo control is adapted to move the swash plate of the pump to a minimum displacement position when all of the closed center control valves are in neutral position thereby minimizing engine horsepower loss while maintaining sufficient system pressure to provide immediate response when one of the control valves is opened.

9 Claims, 4 Drawing Figures

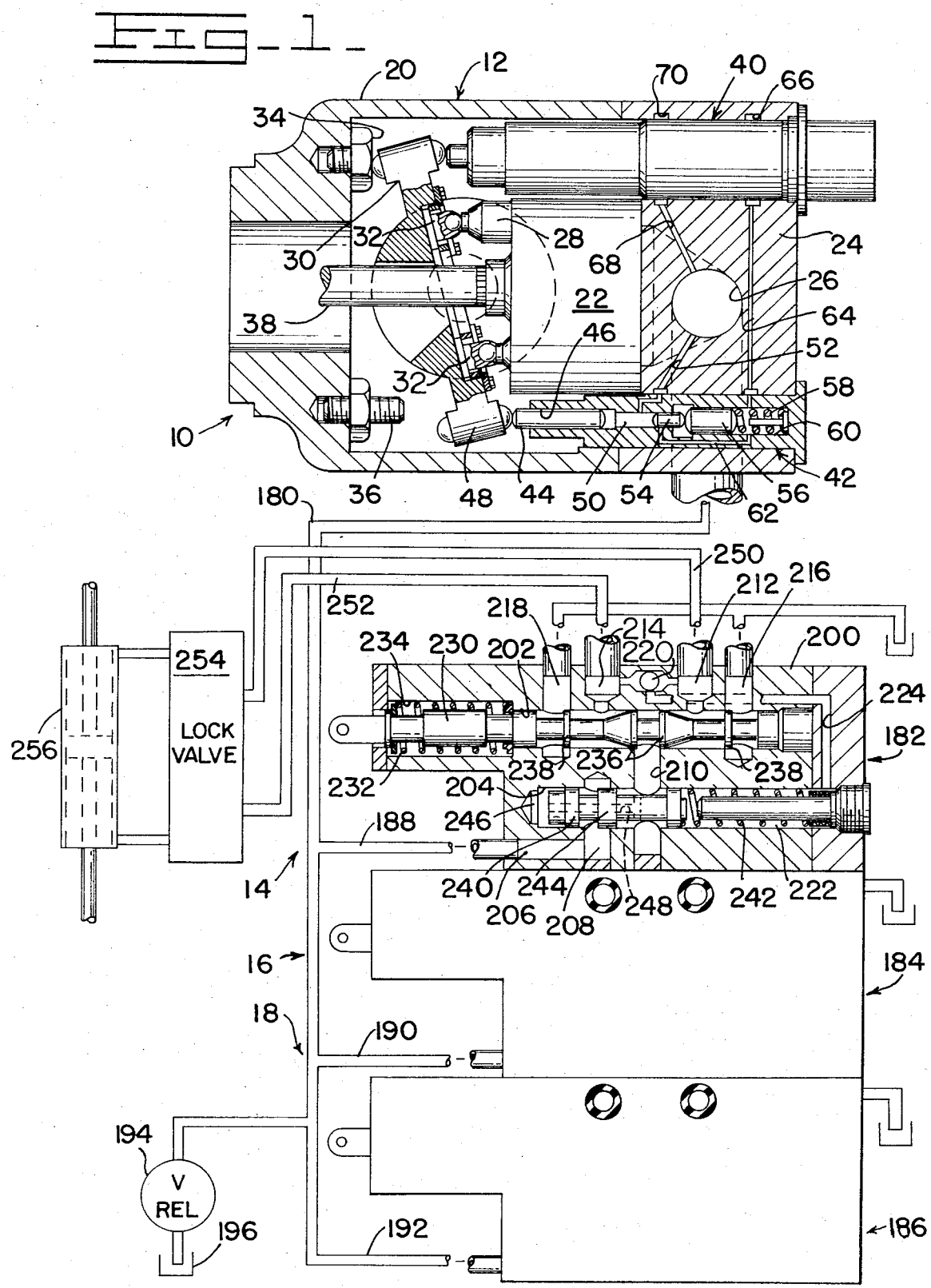

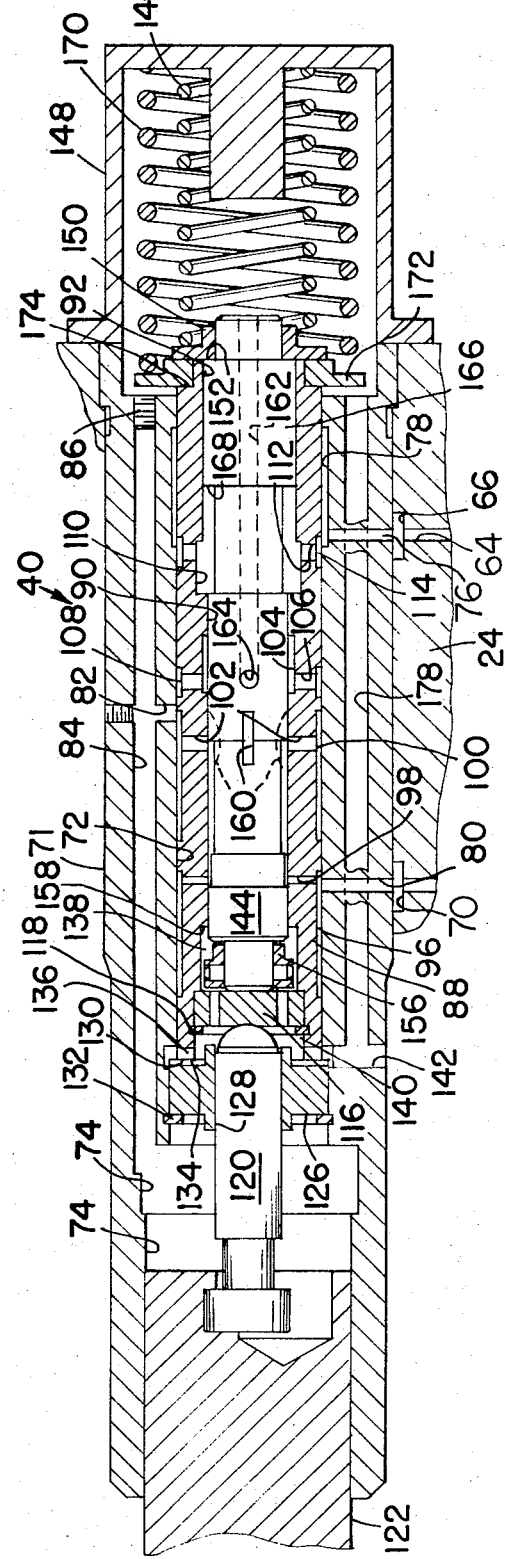

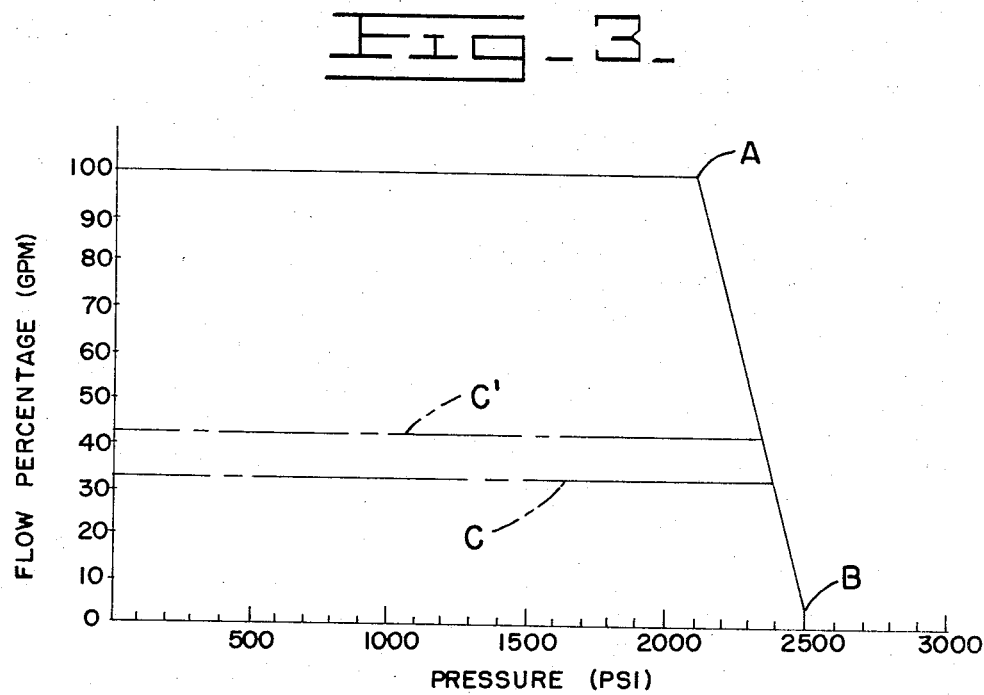
Fig-3-
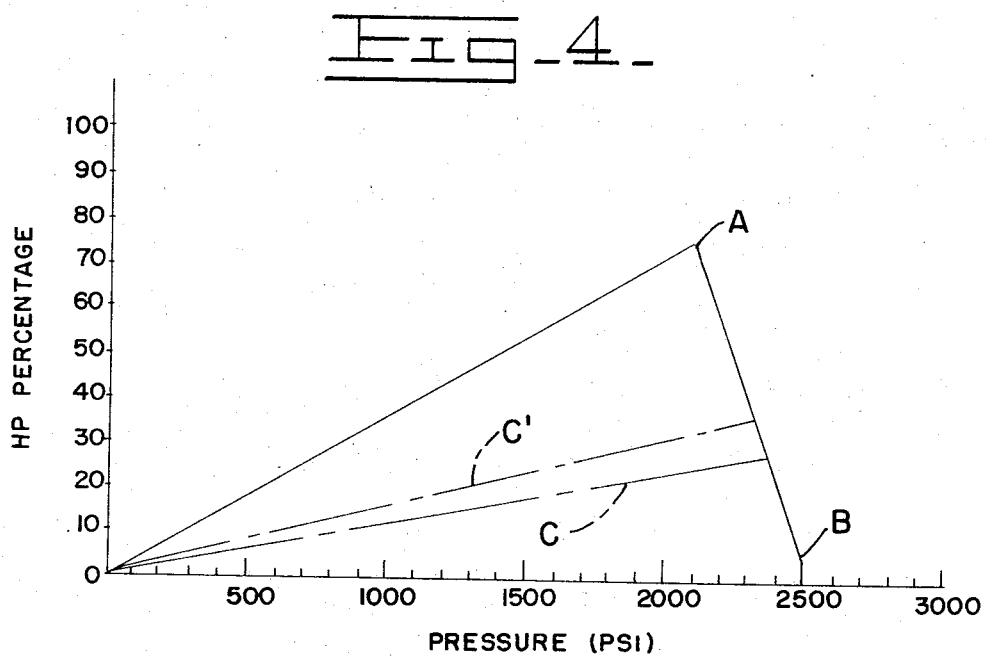
Fig-4-

3,861,145

MULTIPLE HYDRAULIC CONTROL CIRCUITS WITH PRESSURE COMPENSATED FLOW CONTROL AND A SINGLE VARIABLE DELIVERY PUMP

BACKGROUND OF THE INVENTION

This invention is directed to a fluid delivery system. More particularly, this invention is directed to a system having multiple hydraulic control circuits and a servo control for regulating displacement of a variable displacement pump so as to provide pump output in accordance with load circuit demand.

Fluid delivery systems having hydraulic control circuits and pressure compensated flow control valves in association with fixed or variable displacement pumps for maintaining a desired rate of output flow regardless of input or load variations are commonly known today. One such system, known as a load plus system, is shown in U.S. Pat. No. 3,726,093 to Mallott. The load plus system, while satisfactory for many applications where fast response is not required, is unsuitable for applications where fast response is required as where implements of earth-working machinery are to be controlled. An inherent time lag exists since the control valves of such systems when in neutral communicate the pump to reservoir at a relatively low pressure and a period of time is needed for pressurization of the system prior to initiation of load or implement movement.

In many industrial and earthmoving vehicles it is critical that the implement respond immediately upon actuation of the main control valve in order to obtain precise control of the implement. One example of this criticality would be in a motor grader control circuit wherein it is extremely important that certain hydraulic circuits such as steering and blade position controls respond immediately, in order to provide precise control for fine grading of road surfaces and the like. For this reason, it is desirable that a control system be provided which maintains a relatively high positive pressure supply to the main control valve even when the control valve is in a neutral position so that upon actuation of the control valve sufficient fluid pressure is available for immediate movement of the load for precise positioning thereof. It is also important that this be accomplished in applications wherein a multiplicity of separate hydraulic control circuits are supplied by a single variable displacement pump having a size capacity sufficient to supply a plurality of the circuits at the same time while minimizing the horsepower drain on the vehicle engine during all modes of operation.

Another such system combines a fixed displacement pump with a pressure compensated flow control valve which functions to bypass excess pump volume over that demanded by the load. However, this system generally shares the inherent time lag deficiency as with the load plus system for similar reasons. In addition, this system generates heat and wastes horsepower since the excess flow is dumped to reservoir across the flow control valve. Other similar systems are also extant which possess similar deficiencies.

SUMMARY AND OBJECTS

Thus, it is the primary object of this invention to provide a system having hydraulic control circuits including a pump and a control mechanism for providing pump output commensurate to circuit demand.

It is a further object of this invention to provide such a system having pressure compensated flow control.

It is a still further object of this invention to provide such a system providing minimum horsepower drain when the control is in neutral which is capable of immediate response when taken from the neutral position.

The invention takes the form of a system having multiple hydraulic control circuits and a variable displacement pump controlled by a pressure compensated servo control which is responsive to circuit pressure for regulating pump displacement so as to provide pump output commensurate with demand from load circuits. The control includes a control valve for each circuit with a main control valve spool which creates a pair of variable orifices in series and a pressure compensated flow control spool in serial arrangement therewith for precise control of fluid flow volume to a load system in proportion to the opening of the variable orifices. A swash plate of the variable displacement pump is moved to a minimum displacement position by the servo control when the closed center control valves are in the neutral position.

Other objects and advantages will be more readily apparent from a review of the following description and drawings.

BRIEF DESCRIPTION OF THE DRAWINGS

FIG. 1 is a schematic view of a pressure compensated fluid delivery system including a hydraulic control circuit according to the invention illustrating some of the components thereof in cross section;

FIG. 2 is an enlarged cross sectional view of a control cartridge from a component in FIG. 1;

FIG. 3 is a graph illustrating the flow percentage of the pump of the fluid delivery system as a function of pressure; and FIG. 4 is a corresponding graph of horsepower percentage as a function of pressure.

DETAILED DESCRIPTION

With particular reference to the drawings, an improved hydraulic control circuit indicated generally at 10 includes a variable displacement pump generally designated at 12 for supply of hydraulic fluid under pressure to a plurality of separate hydraulic control circuits generally designated at 14, 16 and 18.

Pump 12 is generally of the type disclosed in pending U.S. application Ser. No. 157,535, assigned to the assignee hereof with a modified servo control mechanism as will be more fully explained hereinafter. The pump includes a housing 20 within which is disposed a rotatable cylinder barrel 22 normally urged into rotatable sealing contact with the inner face of a head 24 containing an inlet port (not shown) and an outlet port 26. A plurality of pistons 28 are slidably disposed within accommodating bores in cylinder barrel 22 and are individually adapted for sliding engagement with a tiltable swash plate 30 by an equal number of bearing buttons 32. The swash plate 30 is adapted for limited rotation about an axis perpendicular to the direction of drive shaft 38 within the limits defined by a maximum displacement stop 34 and a minimum displacement stop 36. The angular position of the swash plate 30 is controlled by a pair of control cartridges 40 and 42 which are individually secured in accommodating bores in the head 24 and extend inwardly into the interior of the pump housing 20.

As shown in FIG. 1, control cartridge 42 includes a pistotn 44 housed in a bore 46 therein with an outer end of the piston in engagement with an actuating extension 48 of swash plate 30 and the inner end thereof exposed to a pressure chamber 50 which intercommunicates with outlet port 26 by way of a passage 52 in the head.

A pressure reducing valve is also housed in control cartridge 42 and includes a small diameter piston 54 having one end exposed to the pressure in chamber 50 with its other end abutting one end of a larger piston 56 mounted coaxially therewith. Spring 58 within bore 60 engages the outer end of the piston 56 to urge it and the piston 54 inwardly in opposition to the pressure in chamber 50. A reduced pressure passage 62 communicates with a portion of the chamber 50 normally blocked by the piston 54 and with the chamber of spring 58 which chamber is further communicated by way of a passage 64 to an annular groove 66 which circumscribes the control cartridge 40 for a purpose hereinafter described. The outlet port 26 is further communicated by way of a passage 68 to an annular groove 70 which also circumscribes the control cartridge 40 at a point axially spaced from the groove 66.

As best shown in FIG. 2, control cartridge 40 includes a housing 71 having a relatively small diameter longitudinal bore 72 and a coaxial, enlarged bore 74 adjacent the inner end of the housing. The housing 71 includes a radially directed port 76 which communicates between an annular groove 78 around the bore 72 and the annular groove 66 in the head 24. Another radial port 80 communicates between the bore 72 and the annular groove 70 in the head 24. A radially directed passage 82 communicating with bore 72 at approximately the midpoint thereof communicates with the enlarged bore 74 by way of a longitudinal passage 84, the upper end of which is blocked by a plug 86.

A servo sleeve 88 is slidably disposed in the bore 72 and includes a central longitudinally extending bore 90 and a slightly larger bore 92 disposed coaxially therewith and adjacent the outer end of the sleeve. The sleeve includes a first annular groove 96 which communicates with radially directed port 80 of housing 71 and also communicates by way of a radially directed port 98 with bore 90. A second annualr groove 100 in sleeve 88 communicates with bore 90 by way of a pair of radial ports 102. The servo sleeve further includes an internal annular groove 104 which communicates by way of radial ports 106 with an external annular groove 108. An internal groove 110 communicates by way of radially directed ports 112 with an external groove 114 which in turn communicates with annular groove 78 in housing 71. A perforated stop plate 116 is secured in the inner end of servo sleeve 88 by a snap ring 118 for engagement with a follow up plunger 120 which is secured to the displacement control piston 122 slidably mounted in the large diameter bore 74 of housing 71.

A plunger guide and servo sleeve stop member 126 is secured in the inner end of bore 72 and includes a centrally disposed aperture 128 which slidably receives piston 120. Guide 126 is secured against movement between a shoulder 130 and a snap ring 132 and includes a plurality of slots 134 on its outer face which cooperate with notches 136 in the inner end of servo sleeve 88 to drain a pair of chambers 138 and 140 to the low pressure area of the pump housing 20 (not shown) by way of a radially directed port 142.

A servo spool 144 is slidably mounted in bores 90 and 92 of servo sleeve 88 and is essentially coextensive and coaxial therewith. The inner end of the spool 144 normally abuts the perforated stop plate 116 under the influence of a spring 146 which is disposed within a cap 148 and with its inner end engaging a spring retainer 150 which rests on a shoulder 152 on the outer end of the spool. A motion limiting collar 156 is pinned to the inner end of spool 144 for engagement with a shoulder 158 in the servo sleeve 88 to limit outward travel of the spool relative thereto. The spool includes a plurality of metering slots 160 and a central drain passage 162 communicating between a radially directed port 164 which is aligned with the inner annular groove 104 and the chamber of spring 146 as defined by the cap 148. An outer land 166 on spool 144 is slidably fitted to the bore 92 which, as previously described, is somewhat larger than the bore 90 such that an inner face 168 of the land 166 presents a differential area to pressure in the annular groove 110 which urges the spool 144 outwardly in opposition to the force of the spring 146.

A spring 170 is disposed in the cap 148 with its inner end engaging a spring retainer 172 which is seated on a shoulder 174 at the outer end of the servo sleeve 88 for resiliently urging the servo sleeve into contact with the follow up plunger 120 and the guide and stop member 126. The chamber defined by cap 148 is open to the interior of the pump housing 20 (not shown) by way of a longitudinal passage 178 which communicates with radially directed port 142 opening to the interior of the pump housing as previously described.

Referring now to FIG. 1, pump 12 is adapted to supply fluid under pressure through outlet port 26 and a line 180 to a plurality of control valves 182, 184 and 186 by way of an equal number of branch lines 188, 190 and 192. A relief valve 194 communicates between the pressure supply line 180 and a reservoir 196 for relieving overpressure and limiting the maximum working pressure in the system to a desired safe value. The construction of the control valves 182, 184 and 196 is substantially identical; therefore, only the structure of valve 182 which is shown in section will be described. Valve 182 includes a body 200 having a main directional control bore 202 extending longitudinally therethrough and a flow control bore 204 disposed in spaced parallel relation to the control bore 202. An inlet port 206 is in communication with the supply branch line 188 and communicates to the flow control bore 204 by way of a passage 208. A passage 210 communicates with the flow control bore 204 in axially spaced relation to the passage 208 and also communicates with the main control bore 202 at a point intermediate a pair of axially spaced motor ports 212 and 214. A pair of drain ports 216 and 218 are disposed in axially outwardly spaced relation to the motor ports 212 and 214, respectively. A shuttle valve 220 controls communication between the motor ports 212 and 214 and the outer end chamber 222 of the flow control bore 204 by way of a passage 224.

A main directional control spool 230 is slidably disposed in the bore 202 and is spring centered to a neutral position by spring 232 in bore 234 wherein a pair of lands 236 normally block communication between passage 210 and the motor ports 212 and 214. A pair of axially spaced lands 238 normally provide restricted communication between the motor ports 212 and 214 and the respective adjacent ones of the drain ports 216 and 218. A flow control spool 240 is slidably disposed in bore 204 and is normally urged by a spring 242 toward a position providing open communication between the inlet port 206 and the passage 210. The flow control spool includes a land 244 having metering slots therein for modulating communication between the inlet port 206 and the passage 210 when pressure in the passage 210 is communicated to a chamber 246 at the inner end of the flow control spool by way of a central passage 248.

The motor ports 212 and 214 are connected by way of lines 250 and 252 and a conventional lock valve 254 to the opposite ends of a hydraulic jack 256.

In operation, with the closed center control valves 182, 184 and 186 in a neutral position, the pressure supply line 180 is blocked such that a substantial pressure is generated therein. Due to the influence of the springs 146 and 170 in control cartridge 40, swash plate 30 is normally urged in a non-operative condition to the maximum displacement position shown in FIG. 1 where it contacts maximum displacement stop 34. With the pump operating and pressure in the output port 26, that pressure is communicated by way of passage 68, annular groove 70, passage 80, groove 96, passage 98 to the interior of the servo sleeve 88 immediately below grooves 160 in the servo spool 144. From there the fluid pressure is communicated by port 102, port 82, and longitudinal passage 84 to bore 74 in the housing 71 where it is imposed on the outer end of the piston 122, thus assisting the springs 146 and 170 in holding the swash plate in the maximum displacement position.

The pump output pressure is also communicated by way of passage 52 to chamber 50 whereby the pressure reducing valve pistons 54 and 56 function to communicate a reduced pressure to passage 64 and annular groove 66 around control cartridge 40. From there the pressure is communicated by way of port 76, annular groove 114 and port 112 to the inner end of the bore 92 where the pressure acts on the differential area of shoulder 168 of the spool 144.

When the pressure in the output port 26 of pump 12 reaches approximately 2,100 psi as indicated as point "A" on FIG. 3, due to the block nature of the control valves in a neutral condition, the pressure acting on the differential area of shoulder 168 is sufficient to initiate outward movement of the spool 144 as best seen in FIG. 2. That movement of the servo spool blocks the radial ports 98 to block communication of pressure to the bore 74 and initiates opening of the metering slots 160 to the inner annular groove 104 of the servo sleeve 88. This position is effecive to communicate the chamber of bore 74 by way of passage 84, radial port 82, radial passage 102, slots 160, inner annular groove 104 and passages 164 and 162 to the chamber of the cap 148 housing the springs 146 and 170. Since the cap 148 is drained to the interior of the pump housing by way of the longitudinal passage 178 and radial port 142, the high pressure in chamber 50 acting on the piston 44 will begin to move the swash plate in a clockwise direction to reduce displacement of the pump.

With the control valves remaining in a neutral, blocked condition, this reduction in pump displacement will continue until the pressure reaches approximately 2,500 psi indicated at point "B" of FIG. 3 wherein the pump will be stroked to its minimum displacement position in contact with the minimum displacement stop 36 as seen in FIG. 1. In this position, the pump generates only sufficient flow to make up for leakage in the system and maintain the pressure in the supply line 180.

Under the above describd conditions, the flow control spool 240 will be in approximately the position shown in FIG. 1 whereby fluid from the inlet port 206 is modulated to the passage 210 in amounts sufficient to make up leakage along the control spool 230 and a flow control spool 240.

As the main control spool 230 is moved away from neutral to a metering position providing restrictive communication between the passage 210 and one of the motor ports 212 and 214, an orifice will be created which will determine the volume of fluid to be supplied to the motor 256. The pressure in the pressurized one of the motor ports 212 and 214 will be communicated by way of the shuttle valve 220 and passage 224 to the chamber 222 where it acts in combination with the spring 238 to urge the flow control spool 240 to the left as viewed in FIG. 1. The pressure in passage 210 is somewhat higher than that in the motor port due to the restriction created by main control spool 230 with that pressure being communicated to chamber 246 by way of the passage 248 in flow control spool 240. The pressure in chamber 246 acts in opposition to spring 242 and the motor line pressure in the chamber 222 to maintain the desired pressure differential between the passage 210 and the motor port whereby a constant flow will be provided for a given position of spool 230.

Assuming that the hydraulic jack 256 is movable at a pressure less than 2,500 psi, when the spool 230 is moved to a position communicating the passage 210 with a motor port, the pressure in line 180 will drop, which reduced pressure will be reflected through the pressure reducing valve 54, 56 and in the annular groove 110 immediately below the differential area of the shoulder 168 of the servo spool 144 as shown in FIG. 2. This reduction in pressure will allow the spool 144 to move to the left as seen in FIG. 2 under the influence of spring 146 to block communication between bore 74 and the drain to the interior of the pump housing by blocking the metering slots 160 from communication with the interior annular groove 104. This movement of the servo spool will also open the radial ports 98 to communicate the output pressure from passage 26 through the passage 68, annular groove 70, ports 80 and 98, radial port 102, port 82, and longitudinal passage 84 to the bore 74 to urge the piston 122 outwardly thereof to move the swash plate toward its maximum displacement position such that the pump 12 will supply a volume of fluid substantially equal to that directed to the hydraulic jack 256 across the control spool 230.

Although the maximum output capacity of the pump 12 is predetrmined to an amount sufficient to supply the total demand of all three of the control circuits 14, 16 and 18, the coaction of the orifice generated by the spool 230, the variable orifice created by flow control spool 240, and the servo control mechanism in the control cartridge 40 will move swash plate 30 to an intermediate position which is sufficient to supply only the volume of oil required by the particular positioning of control spool 230.

If the operator moves the control spool in one of the other valves 184 and 186 to an open position, the enlarged total flow path through the valves will result in an additional decrease in the output pressure of the pump which, as previously described with respect to opening of the spool of the valve 182, will coact with the servo control spool 144 and servo sleeve 88 to again increase the displacement of the pump to a position supplying the volume of oil required by the two circuits. Again referring to FIG. 3 and assuming that the positioning of the control spool 230 in the valve 182 demands approximately one-third of the total pump capacity, the line "C" of FIG. 3 represents the displacement position of the pump 12 when only the valve 182 is actuated. As the spool of the valve 184 is actuated to an open position requiring approximately 10 per cent of the total pump capacity the line "C" will move upward along the flow percentage ordinate of FIG. 3 to the position indicated "C'''."

FIG. 4 shows the correspondence between horsepower percentage verses pressure for the "A," "B," "C" and "C'''" positions.

From the foregoing description it is apparent that the disclosed arrangement provides a system wherein the pump output line is maintained in a pressurized condition such that movement of one of the control spools to communicate the pump to the hydraulic jack will result in immediate response without any time lag as would be normally required to achieve pressurization of the lines and passages between the pump and the hydraulic jack. This immediate response is achieved with a minimum of horsepower loss by utilizing a system which automatically decreases the pump output to a minimum value when all of the valves are in a closed neutral position whereby only sufficient oil is pumped to compensate for leakage thereby minimizing the horsepower drain on the engine. Under operative conditions where one or more of the valves is open, the flow control valve, spool 236 and the servo control within the control cartridge 40 of the pump 12 cooeprate to adjust the pump displacement to satisfy only the demand of the active circuit or circuits such that it is not necessary to pump an additional volume of oil which would necessarily have to be bypassed and thus use engine horsepower for pumping that excessive volume of the oil without achieving any useful work in the system.

It is to be understood that the foregoing description is merely illustrative of the preferred embodiments of the invention and that the scope of the invention is not to be limited thereto, but is to be determined by the scope of the appended claims.

What is claimed is:

1. A fluid delivery system including,
   a variable displacement pump having an inlet and an outlet for delivering fluid under pressure,
   a pair of load circuits connected to said outlet,
   a servo control means connected to said pump which is responsive to load circuit pressure for regulating the displacement of said pump and thereby provide pump output commensurate with the demand of the load circuits, and wherein each load circuit comprises,
   a load, and
   control valve means comprising a body, flow control spool means in said body for modulating communication between said outlet and main control spool means including a main control spool slidably located within a second bore in said body and a second spring means biasing said main control spool to a neutral position closing off communication between said flow control spool means and said load, said main control spool having means thereon which are operable to provide a variable orifice intermediate said flow control spool means and said load, and wherein said control valve means is actuable from a neutral position to direct fluid under pressure from said outlet to said load, said control valve means providing pressure compensated flow control whereby immediate response is provided when said control valve means is moved from the neutral position.

2. The system of claim 1 wherein said flow control spool means comprises a flow control spool slidably located within a first bore in said body and a first spring means biasing said flow control spool to a position providing said communication.

3. A fluid delivery system including,
   a variable displacement pump including a pump housing, and having an inlet and an outlet for delivering fluid under pressure,
   a pair of load circuits connected to said outlet,
   a servo control means connected to said pump which is responsive to load circuit pressure for regulating the displacement of said pump and thereby provide pump output commensurate with the demand of the load circuits, wherein said servo control means comprise first and second servo control cartridges at least partially within said housing for moving a swash plate pivotally mounted within said pump housing so as to control pump displacement, and wherein each load circuit comprises,
   a load, and
   control valve means actuable from a neutral position to direct fluid under pressure from said outlet to said load, said control valve means providing pressure compensated flow control whereby immediate response is provided when said valve control means is moved from the neutral position.

4. The system of claim 3 wherein said first servo control cartridge includes a piston housed within a bore therein, said piston extending from an end of said first cartridge in contacting relation with said swash plate for movement thereof.

5. The system of claim 4 wherein said second control cartridge includes a second piston housed within a bore therein and extending from an inner end of said second cartridge in contacting relation with said swash plate for movement thereof in opposition to said first cartridge.

6. The system of claim 5 wherein said second cartridge further comprises a first longitudinal bore and a coaxial, enlarged inner bore adjacent said inner end, a slidable sleeve disposed in said first bore, and a stop plate in the inner end of said sleeve.

7. The system of claim 6 wherein said second cartridge further comprises a follow up plunger connected to said second piston and slidably mounted in said enlarged, inner bore.

8. The system of claim 7 wherein said second cartridge further comprises a sleeve spool within said sleeve, and spring means biasing said sleeve spool into engagement with said stop plate, said sleeve spool including a plurality of metering slots thereon communicating with a plurality of radiallly directed ports in said sleeve.

9. The system of claim 1 further including relief valve means for relieving over pressure from said outlet to a reservoir thereby limiting maximum working pressure in the system to a desired value.

* * * * *